United States Patent [19]
Akiyama et al.

[11] Patent Number: 5,549,350
[45] Date of Patent: Aug. 27, 1996

[54] REAR UNDERBODY STRUCTURE

[75] Inventors: Akira Akiyama, Nagoya; Michio Arakawa, Toyota; Hisashi Ogawa, Aichi-ken; Hartmut M. Kiessig, Shizuoka-ken, all of Japan

[73] Assignee: Toyota Jidosha Kabushiki Kaisha, Toyota, Japan

[21] Appl. No.: 415,504

[22] Filed: Apr. 3, 1995

Related U.S. Application Data

[62] Division of Ser. No. 138,020, Oct. 19, 1993, Pat. No. 5,472,259.

[30] Foreign Application Priority Data

Oct. 20, 1992 [JP] Japan .................................. 4-281835
Nov. 19, 1992 [JP] Japan .................................. 4-310486

[51] Int. Cl.$^6$ .................................. B62D 25/20
[52] U.S. Cl. .................. 296/204; 296/115; 296/209
[58] Field of Search .................. 296/195, 204, 296/209

[56] References Cited

U.S. PATENT DOCUMENTS

| | | | |
|---|---|---|---|
| 2,301,593 | 11/1942 | Ulrich | 296/204 |
| 2,384,096 | 9/1945 | Kishline | 296/35.1 |
| 2,431,524 | 11/1947 | Ulrich et al. | 280/295 |
| 2,954,998 | 10/1960 | Kushner | 296/204 |
| 5,102,187 | 4/1992 | Harasaki | 296/204 |
| 5,110,177 | 5/1992 | Akio | 296/204 |

FOREIGN PATENT DOCUMENTS

| | | | |
|---|---|---|---|
| 245878 | 3/1990 | Japan . | |
| 2108672 | 8/1990 | Japan . | |
| 2117269 | 9/1990 | Japan . | |
| 3025085 | 2/1991 | Japan . | |
| 326677 | 3/1991 | Japan . | |
| 3100580 | 10/1991 | Japan . | |
| 4072770 | 3/1992 | Japan | 280/781 |

OTHER PUBLICATIONS

Automotive Industries, Body Design, Aug. 1, 19940.

*Primary Examiner*—Dennis H. Pedder
*Attorney, Agent, or Firm*—Cushman, Darby & Cushman

[57] ABSTRACT

A rear underbody which forms a rear-under section of a vehicle body is provided with a pair of rear floor side members disposed along a longitudinal direction of the vehicle body in respective vicinities of both end portions of the rear underbody in a transverse direction of the vehicle body. The pair of rear floor side members each forms an enclosed cross-sectional configuration which extends in the longitudinal direction of the vehicle body. A cross member which extends substantially straight in the transverse direction of the vehicle body is disposed apart from and under a rear floor pan between the pair of rear floor side members at respective substantially central portions of a pair of rear wheel house inners. Both end portions, in the transverse direction of the vehicle body, of the cross member are respectively welded to an inner surface of the inside wall portion, in the transverse direction of the vehicle body, of the rear floor side member. A lower-arm bracket which supports a rear lower arm is disposed in a central portion, in the transverse direction of the vehicle body, of a lower surface of the cross member. This causes vibration of the rear floor pan to be sufficiently controlled and causes road noise to be sufficiently reduced.

2 Claims, 14 Drawing Sheets

REAR UNDERBODY STRUCTURE

This is a division of application Ser. No. 08/138,020, filed Oct. 19, 1993, now U.S. Pat. No. 5,472,259.

BACKGROUND OF THE INVENTION

1. Field of the Invention

The present invention relates to a rear underbody structure of a vehicle body, and particularly to a rear underbody structure, which has a rear subframe, of a vehicle body.

2. Description of the Related Art

Generally, input force applied from a road surface to a tire is transmitted via a suspension to a vehicle body. In particular, when a vehicle is running on a rough surface road, input force applied to a tire increases. Therefore, vibration of the body increases, and road noise is generated.

On the other hand, in order to reduce road noise, it is necessary only to cut off input force applied from a road surface. However, in this case, control stability of the body deteriorates. Further, although it is also possible to contemplate providing a sound insulation material in a portion of the body producing a sound or increasing the rigidity of a body input portion of a suspension, in these cases there exist drawbacks such as an increase in weight of the body, an increase in cost, and the like.

A rear underbody structure which improves these drawbacks is disclosed in Japanese Utility Model Application Laid-Open No. 2-108672(1990).

As shown in FIG. 13, there is provided a rear underbody structure 70 in which a portion of a rear floor pan 72 in the vicinity of a connecting portion of a cross member 74 and a lower arm 76 swells upward such that a buffer space 78 is formed between the rear floor pan 72 and the cross member 74. Impact load applied from a rear wheel 80 via the lower arm 76 is absorbed by the buffer space 78, thereby causing vibration of the rear floor pan 72 to be controlled so as to reduce road noise.

However, in the above-described rear underbody structure 70, each region 74A in the vicinity of both end portions of the cross member 74 in a transverse direction of a vehicle body is bent upward, and each end of the cross member 74 is connected to a rear floor side member 82. Accordingly, cross-sectional deformation of both end portions 74B, in the transverse direction of the vehicle body, of the cross member 74, which is caused by an input load, increases. With this cross-sectional deformation vibration of the rear floor side members 82 to which both end portions 74B, in the transverse direction of the vehicle body, of the cross member 74 are respectively connected increases. As a result, there are drawbacks in that the vibration of the rear floor pan 72 cannot be sufficiently controlled and road noise cannot be sufficiently reduced.

Further, a rear underbody structure 90 shown in FIG. 14 is disclosed in Japanese Utility Model Application Laid-Open No. 3-26677(1991). In the rear underbody structure 90, a reinforcing gusset 94 is fixed to the inside of a wheel house inner 92 in the transverse direction of the vehicle body and a lower end of the reinforcing gusset 94 is disposed in and fixed to a rear floor side member 96. A cross member 98 is horizontally disposed in and fixed to a region within the rear floor side member 96, in which the reinforcing gusset 94 is to be disposed. A rear subframe 100 is fixed to a bottom surface of respective regions within the left-side and right-side rear floor side members 96. Accordingly, since input force applied from the rear subframe 100 can be transmitted via the reinforcing gusset 94 to the wheel house inner 92, the mounting rigidity of the rear subframe 100 can be improved. Further, since the regions within the left-side and right-side rear floor side members 96, at which the reinforcing gusset 94 is disposed and fixed to the respective rear floor side members 96, interconnect via the cross member 98 and the rear subframe 100, the rigidity of the body input portion of a suspension can be increased.

However, in the above-described rear underbody structure 90, a mounting point S of the rear subframe 100 is located on a main axis H passing through an axial center P of the rear side member 96, and the mounting point S is offset downwardly with respect to the axial center P of the rear side member by a dimension Lz. Accordingly, among input force Fy, which generates from the mounting point S of the rear subframe 100 and acts inwardly in a horizontal direction of the vehicle body, and input force Fz, which acts downwardly in a vertical direction of the vehicle body, the influence of moment FyLz about the axial center P of the rear side member 96 which is caused by the input force Fy increases. As a result, as shown by an imaginary line in FIG. 14, the cross member 98 bends upward and the floor pan 102 is vibrated to produce road noise. Meanwhile, in order to reduce the vibration, a dynamic damper is conventionally mounted on the rear subframe 100 to reduce input force Fy, resulting in an increase in the weight of the body.

SUMMARY OF THE INVENTION

In view of the above-described facts, an object of the present invention is to provide a rear underbody structure, which can sufficiently control vibration of a rear floor pan without causing an increase in the weight of a vehicle body, and which can sufficiently reduce road noise.

A rear underbody structure according to one aspect of the present invention comprises: a pair of rear floor side members which is disposed along a longitudinal direction of a vehicle body in respective vicinities of both ends, in a transverse direction of the vehicle body, of a rear-under section of the vehicle body; a cross member, end portions of the cross member in the transverse direction of the vehicle body are respectively connected to the opposed side surfaces of the pair of rear floor side members and which extends substantially straight in the transverse direction of the vehicle body and spaced apart from a rear floor pan; and a lower-arm bracket which is connected to the cross member and supports a rear lower arm.

In the rear underbody structure according to the present invention, since the cross member extends substantially straight, when a load is imparted from the rear lower arm via the lower-arm bracket to the cross member, the cross-sectional deformation of both ends, in the transverse direction of the vehicle body, of the cross member is smaller than the deformation of a conventional structure in which the cross member is bent in the vicinities of both end portions thereof in the transverse direction of the vehicle body. Accordingly, vibration of the rear floor side member, to which one of both end portions, in the transverse direction of the vehicle body, of the cross member is connected, can be sufficiently controlled and road noise can be sufficiently reduced. Further, when the pair of rear floor side members vibrates in directions in which they approach each other, the cross member which extends substantially straight serves as a beam to sufficiently control vibration of the pair of rear floor side members. In addition, since the rear floor pan is spaced apart from the cross member, vibration of the cross member is not directly transmitted to the rear floor pan, so that vibration of the rear floor pan can be sufficiently controlled and road noise can be sufficiently reduced.

A rear underbody structure according to another aspect of the present invention comprises: a pair of rear floor side members which is disposed along a longitudinal direction of a vehicle body in respective vicinities of both ends, in a transverse direction of the vehicle body, of a rear-under section of the vehicle body; a cross member, both end portions of the cross member in the transverse direction of the vehicle body are respectively connected to the opposed side surfaces of the pair of rear floor side members; and a rear subframe having a mounting point in a vicinity of a connecting portion of each of the pair of rear floor side members and the cross member. In the above-described rear underbody structure, the mounting point of the rear subframe is positioned between a line which connects respective axial centers of the pair of rear floor side members and a line which connects respective lower end surfaces of the pair of rear floor side members.

In the rear underbody structure according to the present invention, the mounting point of the rear subframe is positioned between the line which connects the respective axial centers of the pair of rear floor side members and the line which connects lower end surfaces of the pair of rear floor side members and within an area located inwardly, in the transverse direction of the vehicle body, of each inner side surface of the pair of rear floor side members. Therefore, moment about the axial center of the rear floor side member, which is generated by input force imparted inwardly in a horizontal direction with respect to the mounting point of the rear subframe due to input force from the lower arm, and moment about the axial center of the rear floor side member, which is generated by input force imparted downwardly in a vertical direction with respect to the mounting point of the rear subframe due to input force from the lower arm, offset each other. Accordingly, deformation of the cross member in a vertical direction can be decreased and vibration of the rear floor pan can be sufficiently controlled without providing a dynamic damper, i.e., without causing an increase in weight of the body. Road noise can be sufficiently reduced as well.

Further, in general, input force imparted inwardly in a horizontal direction with respect to the mounting point of the rear subframe due to an input force from the lower arm is larger than input force imparted downwardly in a vertical direction with respect to the mounting point of the rear subframe due to input force from the lower arm. Therefore, in the rear underbody structure according to the present invention, since the length between the line which connects the respective axial centers of the pair of rear floor members and the mounting point of the rear subframe is shorter than the length between a perpendicular line drawn from the respective axial centers of the pair of rear floor side members and the mounting point of the rear subframe, moment about the axial center of the rear floor side member after offset approaches zero and road noise can be reduced even more without causing an increase in the weight of the vehicle body.

DESCRIPTION OF THE PREFERRED EMBODIMENTS

Figure 1:
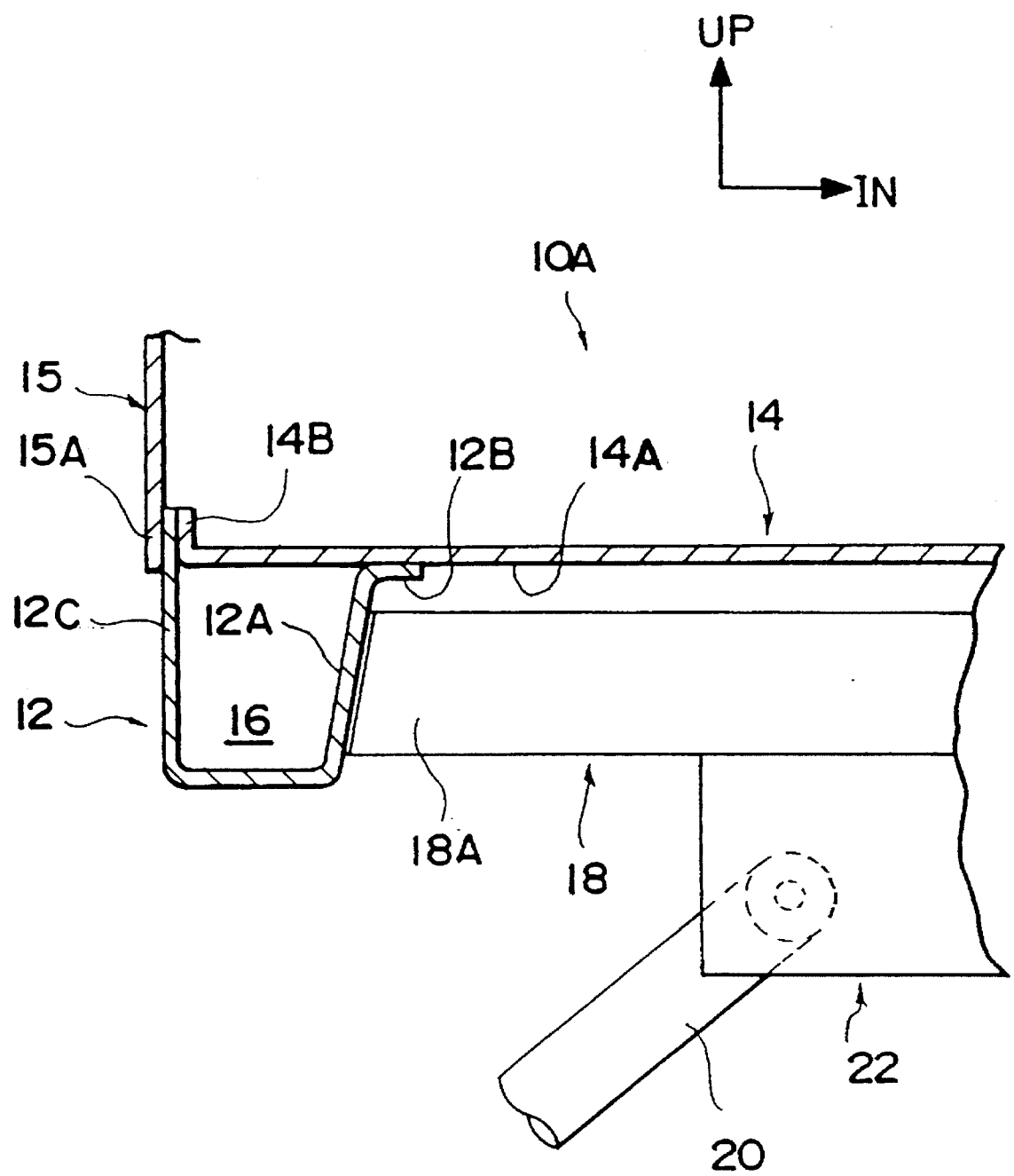
FIG. 1 is a cross-sectional view, when seen from the front of a vehicle body, illustrating a rear underbody structure according to a first embodiment of the present invention.
Figure 2:
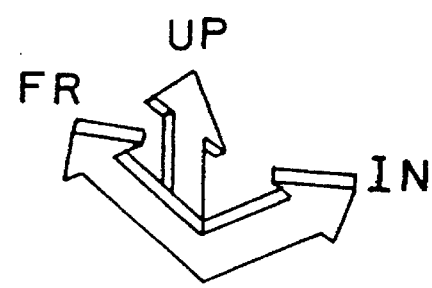
FIG. 2 is a perspective view, when seen diagonally from the front of an inner vehicle body, illustrating a part of the rear underbody structure according to the first embodiment of the present invention.
Figure 2:
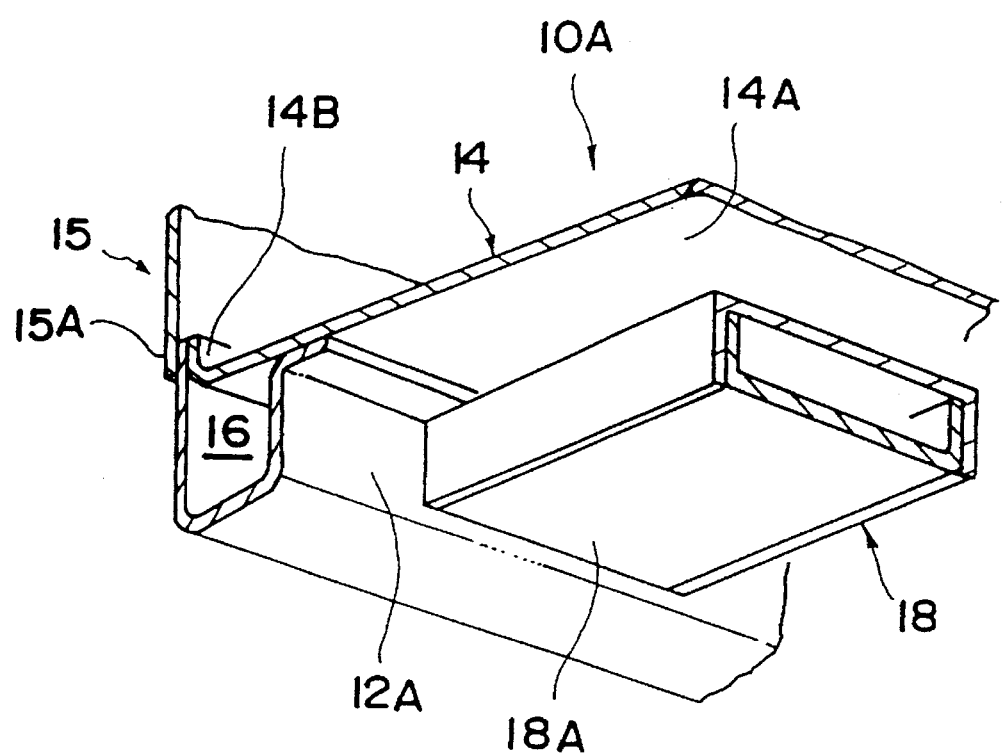
Figure 3:
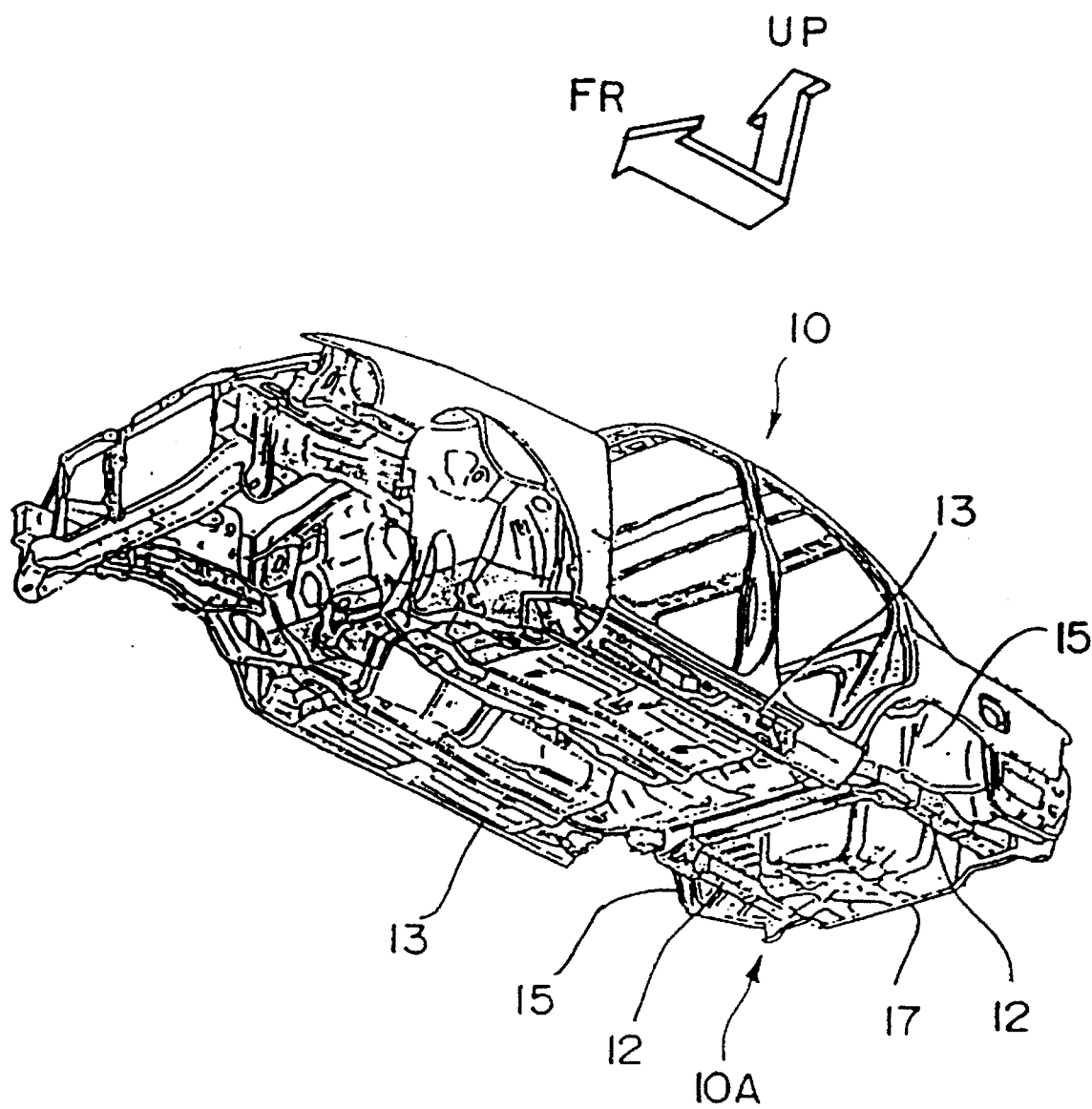
FIG. 3 is a perspective view, when seen diagonally from the front of the vehicle body, illustrating a vehicle lower part to which the rear underbody structure according to the first embodiment of the present invention is applied.

Referring first to FIG. 1 through FIG. 3, a first embodiment of a rear underbody structure according to the present invention will be described. Note that arrows "FR", "IN", and "UP", shown in the accompanying drawings, respectively represent: the forward direction of a vehicle; an inward direction thereof relative to a transverse axis of the vehicle; and the upward direction thereof.

FIG. 3 illustrates a rear underbody 10A forming a rear-under section of a motor vehicle body 10, in which a pair of rear floor side members 12 is disposed in the vicinity of both transverse-direction end portions of the rear underbody 10A along a longitudinal direction of the vehicle body. A front-end portion of each of the pair of rear floor side members 12 is connected to a floor side inner member 13, and a rear end portion thereof is connected to a lower back panel 17.

As illustrated in FIG. 1, the rear floor side member 12 has a substantially U-shaped cross-sectional configuration when seen from the longitudinal direction of the vehicle body, with an opening thereof being oriented upward. An upper end portion of an inside wall portion 12A, in the transverse direction of the vehicle body, of the rear floor side member 12 is bent inward in the transverse direction of the vehicle body so that it is formed into a flange 12B. The flange 12B is welded to a lower surface 14A of a rear floor pan 14. Both end portions of the rear floor pan 14 in the transverse direction of the vehicle body are respectively bent upward so that they are each formed into a flange 14B. The flange 14B is welded to an inner surface of the outside wall portion 12C, in the transverse direction of the vehicle body, of the rear floor side member 12 at an upper end portion thereof.

Accordingly, the rear floor side member 12, together with the rear floor pan 14, forms an enclosed cross-sectional configuration 16 which extends in a longitudinal direction of the vehicle body.

Further, a lower end edge portion 15A of a rear wheel house inner 15 is welded to an outside surface of the outside wall portion 12C, in the transverse direction of the vehicle body, of the rear floor side member 12 at an upper end portion thereof.

FIG. 2 illustrates a cross member 18 which extends substantially straight in the transverse direction of the vehicle body and is disposed apart from and under the rear floor pan 14 between the pair of rear floor side members 12 at the respective substantially central portions of the pair of rear wheel house inners 15. The cross member 18 forms an enclosed rectangular cross-sectional configuration when seen from the transverse direction of the vehicle body as shown in FIG. 2. The cross member 18 is rectangularly formed as shown in FIG. 2. and has an aspect ratio such that the dimension thereof in a longitudinal direction of the vehicle body is sufficiently long and the dimension thereof in a vertical direction of the vehicle body is short. Both end portions 18A of the cross member 18 in the transverse direction of the vehicle body are each welded to a transverse-direction inner surface of the inside wall portion 12A, in the transverse direction of the vehicle body, of the rear floor side member 12.

FIG. 1 illustrates a lower-arm bracket 22 which supports a rear lower arm 20 in a central portion, in the transverse direction of the vehicle body, on a lower surface of the cross member 18. The lower-arm bracket 22 has sufficient rigidity and is welded to the cross member 18 or is connected thereto by means of a bolt or a nut. Four rear lower arms 20 are supported axially on the front and rear surfaces, in the longitudinal direction of the vehicle body, of the lower-arm bracket 22. These rear lower arms 20 support a tire via a wheel carrier (not shown), so that a so-called double-link suspension is formed.

Next, operation of the present embodiment will be described.

In the rear underbody structure according to the present embodiment, since the cross member 18 extends substantially straight, when a load is imparted from the rear lower arm 20 via the lower-arm bracket 22 to the cross member 18, the cross-sectional deformation of both end portions 18A, in the transverse direction of the vehicle body, of the cross member 18 is smaller than a conventional structure in which regions in the vicinity of both end portions, in the transverse direction of the vehicle body, of the cross member are curved.

Accordingly, vibration of the rear floor side member 12 to which both end portions 18A, in the transverse direction of the vehicle body, of the cross member 18 are connected can be sufficiently controlled and road noise can be sufficiently reduced.

Further, when the pair of rear floor side members 12 vibrates in directions in which they approach each other, the cross member, which extends substantially straight, serves as a beam and sufficiently controls the vibration of the pair of rear floor side members 12.

In addition, since the rear floor pan 14 is spaced apart from the cross member 18, vibration of the cross member 18 is not directly transmitted to the rear floor pan 14. As a result, vibration of the rear floor pan 14 can be sufficiently controlled and road noise can be sufficiently reduced.

Moreover, in the present embodiment, input force from a tire which vibrates during running on a rough surface road is imparted via the rear lower arm 20 and the lower-arm bracket 22 to the cross member 18. However, since the cross member 18 is formed with the aspect ratio such that one dimension thereof in the longitudinal direction of the vehicle body is sufficiently long, vibration of the cross member 18 main body in the longitudinal direction of the vehicle body is small even though the vertical vibration of the cross member 18 occurs. Vibration of the rear floor side member 12 in the longitudinal direction of the vehicle body therefore decreases. Accordingly, vibration of the rear floor pan 14 can be controlled and in-phase and opposite-phase displacement of the front-side and rear-side lower arms, which form a double-link suspension, when the vehicle is running are extremely small, thereby resulting in an excellent effect in control stability.

Figure 4:
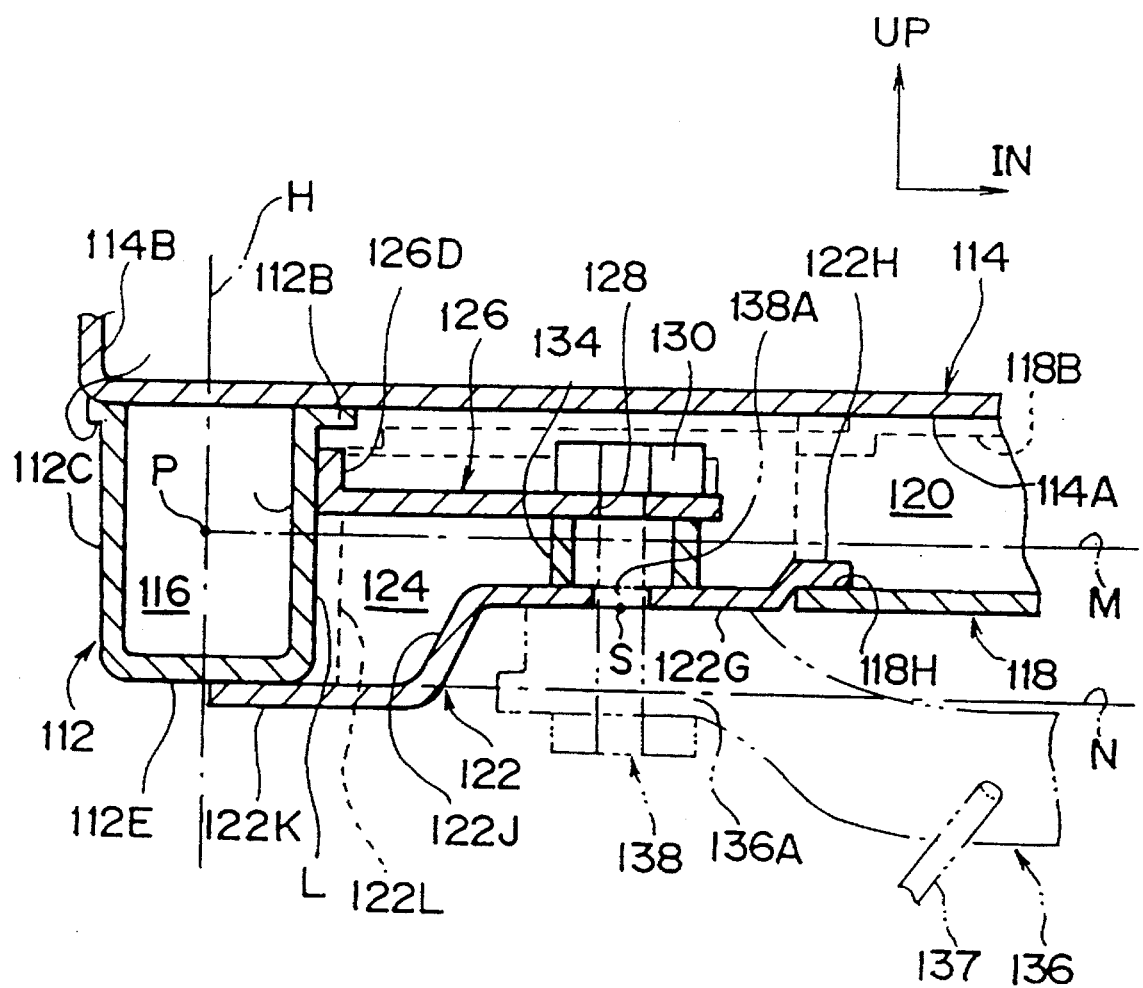
FIG. 4 is a cross-sectional view, when seen from the front of the vehicle body, illustrating a rear underbody structure according to a second embodiment of the present invention.
Figure 5:
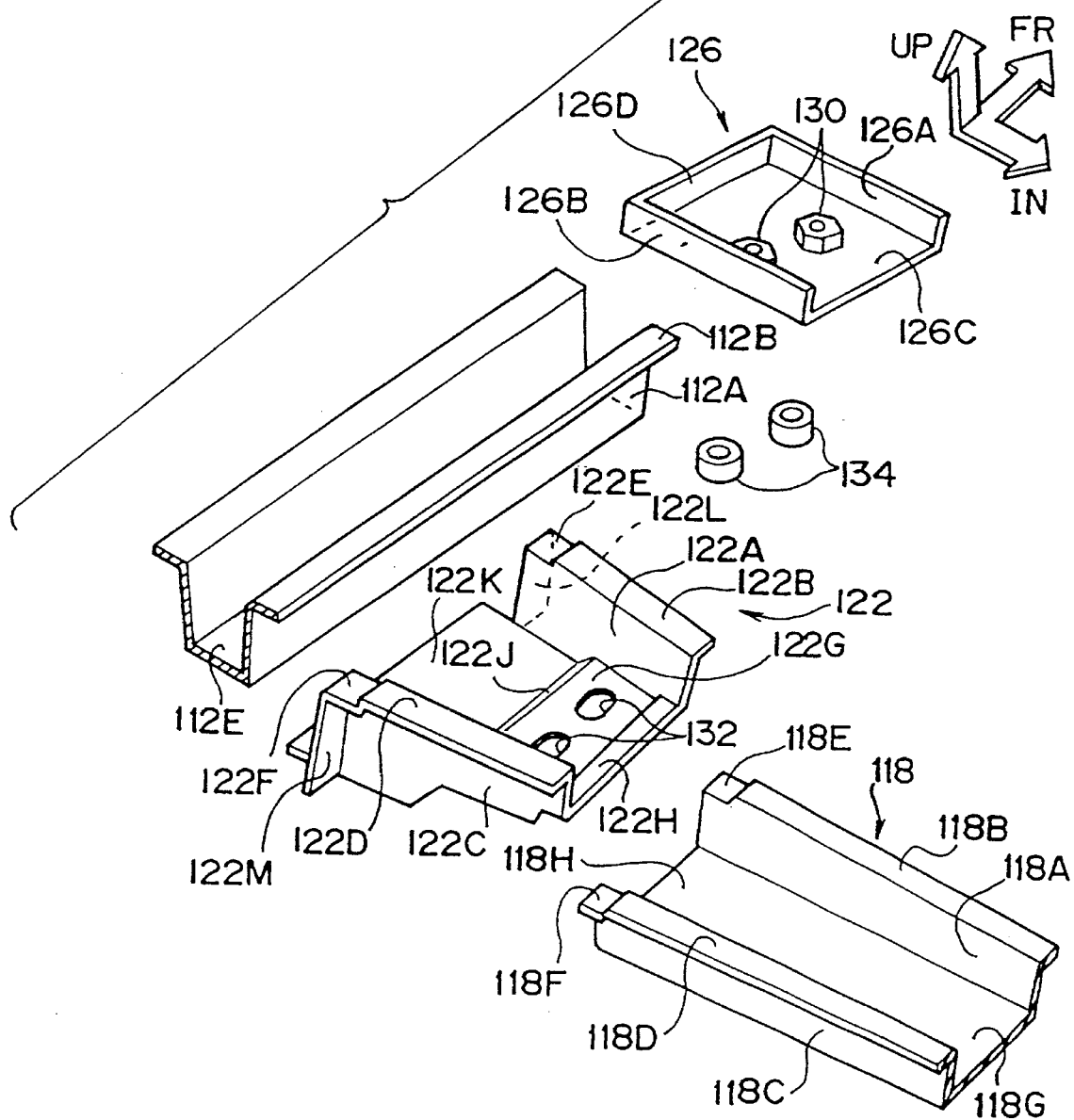
FIG. 5 is an exploded perspective view, when seen diagonally from the front of an inner vehicle body, illustrating a mounting portion of a rear subframe of the rear underbody structure according to the second embodiment of the present invention.

Referring to FIG. 4 through FIG. 6, a second embodiment of a rear underbody structure according to the present invention will be described. Note that arrows "FR", "IN", and "UP", shown in the accompanying drawings, respectively represent: the forward direction of a vehicle; an inward direction thereof relative to a transverse axis of the vehicle; and the upward direction thereof.

As illustrated in FIG. 4, a rear floor side member 112 has a substantially U-shaped cross-sectional configuration when seen from a longitudinal direction of the vehicle body, with an opening thereof being oriented upward. An upper end portion of an inner wall portion 112A, in a transverse direction of the vehicle body, of the rear floor side member 112 is bent inward in the transverse direction of the vehicle body so as to be formed into a flange 112B. An upper end portion of an outside wall portion 112C, in the transverse direction of the vehicle body, of the rear floor side member 112 is bent outward in the transverse direction of the vehicle body so as to be formed into a flange 112D. These flanges 112B, 112D are respectively welded to an end portion, in the transverse direction of the vehicle, of a lower surface 114A of a rear floor pan 114. Accordingly, the rear floor side member 112 forms an enclosed cross-sectional configuration 116 which extends in the longitudinal direction of the vehicle body together with the rear floor pan 114.

Meanwhile, an end portion, in the transverse direction of the vehicle body, of the rear floor pan 114 is bent upward so as to be formed into a flange 114B. The flange 114B is welded to a lower end edge portion of the rear wheel house inner 15 (see FIG. 3).

A rear floor cross member 118 which extends substantially straight in the transverse direction of the vehicle body is located in a substantially central portion of the rear wheel house inner of the pair of rear floor side members 112.

As illustrated in FIG. 5, the rear floor cross member 118 has a substantially U-shaped cross-sectional configuration when seen from the transverse direction of the vehicle body, with an opening thereof being oriented upward. An upper end portion of a front-side wall portion 118A, in a longitudinal direction of the vehicle body, of the rear floor cross member 118 is bent toward the front in the longitudinal direction of the vehicle body so as to be formed into a flange 118B. An upper end portion of a rear-side wall portion 118C, in the longitudinal direction of the vehicle body, of the rear floor cross member 118 is bent toward the rear in the longitudinal direction of the vehicle body so as to be formed into a flange 118D.

As illustrated in FIG. 4, these flanges 118B, 118D are respectively welded to the lower surface 114A of the rear floor pan 114. Accordingly, the rear floor cross member 118 forms an enclosed cross-sectional configuration which extends in the transverse direction of the vehicle body together with the rear floor pan 114.

As illustrated in FIG. 5, a bracket 122 is disposed outside of the rear floor cross member 118 in the transverse direction of the vehicle body. The bracket 122 has a substantially U-shaped cross-sectional configuration when seen from the transverse direction of the vehicle body, with an opening thereof being oriented upward. An upper end portion of a front-side wall portion 122A, in the longitudinal direction of the vehicle body, of the bracket 122 is bent toward the front in the longitudinal direction of the vehicle body so as to be formed into a flange 122B. An upper end portion of a rear-side wall portion 122C, in the longitudinal direction of the vehicle body, of the bracket 122 is bent toward the rear in the longitudinal direction of the vehicle body so as to be formed into a flange 122D.

As illustrated in FIG. 4 and FIG. 5, these flanges 122B, 122D are respectively welded to the lower surface 114A of the rear floor pan 114. In addition, concave step portions 118E, 118F which are respectively disposed at inward end portions, in the transverse direction of the vehicle body, of the flanges 118B, 118D of the rear floor cross member 118 are welded to the inward lower surface, in the transverse direction of the vehicle body, of the flanges 122B, 122D. Meanwhile, concave step portions 122E, 122F are respectively formed in outward end portions, in the transverse direction of the vehicle body, of the flanges 122B, 122D and are welded to the lower surface of the flange 112B of the rear floor side member 112.

A convex step portion 122H is formed in an inward end portion, in the transverse direction of the vehicle body, of a base portion 122G of the bracket 122. The step portion 122H is welded to an outward end portion 118H, in the transverse direction of the vehicle body, of the base portion 118G of the rear floor cross member 118. Further, an outward end portion, in the transverse direction of the vehicle body, of the bracket 122 is formed so as to be deeper than an inward end portion of the bracket 122. An inclined portion 122J is formed in a substantially intermediate portion, in the transverse direction of the vehicle body, of the bracket 122. A flange 122K which extends outward in the transverse direction of the vehicle body is provided in an outward end portion, in the transverse direction of the vehicle body, of the base portion 122G of the bracket 122. The flange 122K is welded to a lower surface of a base portion 112E of the rear floor side member 112.

Further, an outward end portion, in the transverse direction of the vehicle body, of the front-side wall portion 122A, in the longitudinal direction of the vehicle body, of the bracket 122 is bent toward the front in the longitudinal direction of the vehicle body so as to be formed into a flange 122L. An outward end portion, in the transverse direction of the vehicle body, of the rear-side wall portion 122C in the longitudinal direction of the vehicle body is bent toward the rear in the longitudinal direction of the vehicle body so as to be formed into a flange 122M.

As illustrated in FIG. 4, these flanges 122L, 122M are welded to an inner wall portion 112A, in the transverse direction of the vehicle body, of the rear floor side member 112. Accordingly, the bracket 122, together with the rear floor pan 114, forms an enclosed cross-sectional configuration 120 and an enclosed cross-sectional configuration 124 which connects the rear floor side members 112 and extends in the transverse direction of the vehicle body.

Within the enclosed cross-sectional configuration 124, a rectangular-shaped reinforcing plate 126 is disposed in a substantially horizontal direction.

As illustrated in FIG. 5, the reinforcing plate 126 has a substantially U-shaped cross-sectional configuration when seen from the transverse direction of the vehicle body, with an opening thereof being oriented upward. A front-side wall portion 126A, in a longitudinal direction of the vehicle body, of the reinforcing plate 126 is welded to the front-side wall portion 122A, in the longitudinal direction of the vehicle body, of the bracket 122. A rear-side wall portion 126B, in the longitudinal direction of the vehicle body, of the reinforcing plate 126 is welded to a rear-side wall portion 122C, in the longitudinal direction of the vehicle body, of the bracket 122. Further, a side wall portion 126D which extends upward is formed at an outward end portion, in the transverse direction of the vehicle body, of a base portion 126C of the reinforcing plate 126. The side wall portion 126D is welded to an inner wall portion 112A, in the transverse direction of the vehicle body, of the rear floor side member 112. The ends of the side wall portion 126D are respectively connected to the front-side wall portion 126A in the longitudinal direction of the vehicle body and the rear-side wall portion 126B in the longitudinal direction of the vehicle body.

A pair of through holes 128 (see FIG. 4), which are disposed at a predetermined interval along the longitudinal direction of the vehicle body, is formed at a substantially central portion, in the longitudinal direction of the vehicle body, of the base portion 126C of the reinforcing plate 126. On the upper surface of the base portion 126C, a pair of nuts 130 is welded such that the nuts 130 are respectively coaxial with the through holes 128.

A pair of oblong holes 132 is formed in corresponding portions of the base portion 122G of the bracket 122, which are opposite to the pair of through holes 128. A longitudinal direction of the pair of oblong holes 132 corresponds to the longitudinal direction of the vehicle body. A pair of spacers 134 is welded between the base portion 122G of the bracket 122 and the base portion 126C of the reinforcing plate 126 such that the spacers 134 are respectively coaxial with the pair of through holes 128.

Accordingly, as illustrated in FIG. 4, a rear subframe 136 to which a lower arm 137 is attached is mounted on the bracket 122 in such a way that respective leg portions 138A of two mounting bolts 138, which are inserted from below into a mounting portion 136A, pass through the oblong holes 132, spacers 134 and through holes 128, respectively, and are screwed into the nuts 130.

Figure 6A:
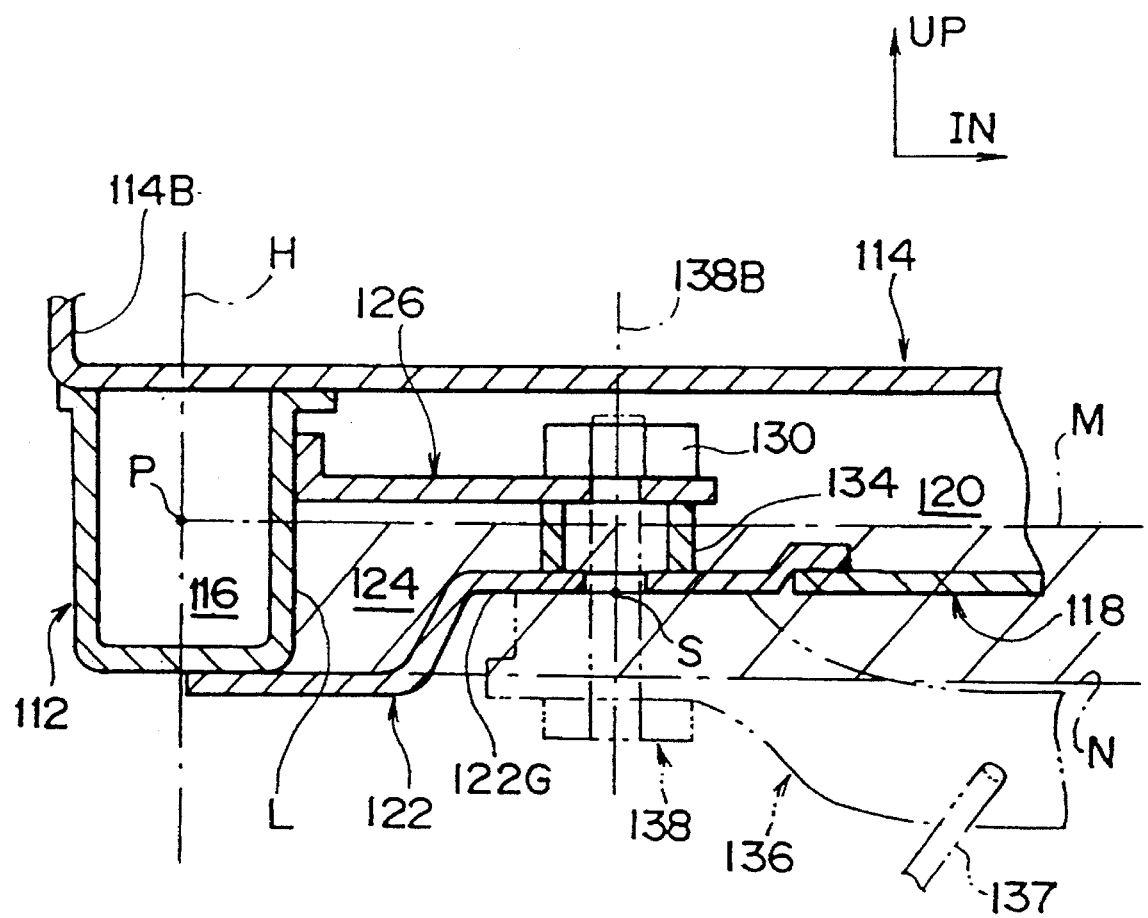
FIG. 6A is a cross-sectional view illustrating an area at which a mounting point of the rear subframe of the rear underbody structure according to the second embodiment of the present invention is to be positioned.

FIG. 6A illustrates a mounting point S at which the rear subframe 136 is mounted on the bracket 122, i.e., an intersection point S of the lower surface of the base portion 122G of the bracket 122 and a shaft line 138B of the mounting bolt 138. The mounting point S is disposed within the region indicated by slanted lines in FIG. 6A, which is located inwardly of the respective inner surface positions L of the pair of rear floor side members in the transverse direction of the vehicle body, between the line M, which connects respective axial centers P of the pair of rear floor side members 112, and the line N, which connects lower end surfaces of the base portions 112E of the pair of rear floor side members 112.

Figure 6B:
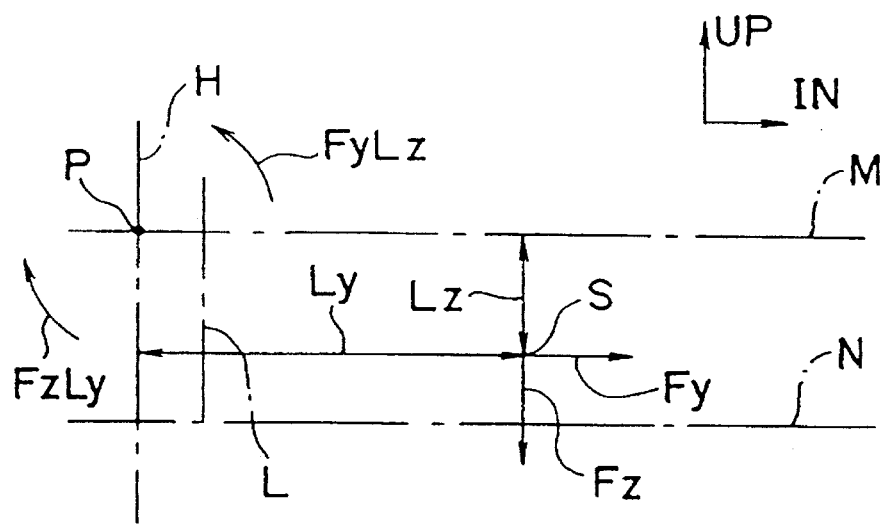
FIG. 6B is an operation schematic diagram of the rear underbody structure according to the second embodiment of the present invention.

Further, FIG. 6B illustrates that a length Lz between the line M, which connects the respective axial centers P of the pair of rear floor side members, and the mounting point S of the rear subframe is shorter than a length Ly between a vertical line H, which is drawn from the respective axial centers P of the pair of rear floor side members, and the mounting point S of the rear subframe.

Next, operation of the present embodiment will be described.

Generally, input force from a vibrating tire caused by running on a rough surface road is imparted via the lower arm 137 to the rear subframe 136. In the rear underbody structure of the present embodiment, the mounting point S of the rear subframe 136 is disposed within the region (indicated by slanted lines in FIG. 6A) which is located inwardly of the respective inner surface positions L of the pair of rear floor side members 112 in the transverse direction of the vehicle body, between the line M, which connects respective axial centers P of the pair of rear floor side members 112, and the line N, which connects lower end surfaces of the pair of rear floor side members 112. Therefore, as illustrated in FIG. 6B, moment FyLz about the axial center P of the rear floor side member 112 (in FIG. 6B, in a direction opposite to a clockwise direction), which is generated by input force Fy imparted inward in a horizontal direction with respect to the mounting point of the rear subframe 136 due to input force from the lower arm 137, and moment FzLy about the axial center P of the rear floor side member 112 (in FIG. 6B, in a clockwise direction), which is generated by input force Fz imparted downward in a vertical direction with respect to the mounting point S of the rear subframe 136 due to input force from the lower arm 137, offset each other.

Accordingly, torsion of the rear floor side member 112 is reduced, and deflection, in a vertical direction, of the rear floor cross member 118 can be reduced. Vibration of the rear floor pan can thereby be sufficiently controlled without mounting a dynamic damper on the body, i.e., without causing an increase in weight, and road noise can be sufficiently reduced.

In addition, although the cross section of the rear subframe 136 is made smaller in accordance with the rear subframe 136 being made shorter, the flexural rigidity of the rear subframe 136 can be assured, thereby resulting in further reduced weight of the body.

Further, in general, input force Fy, which is imparted inward in a horizontal direction with respect to the mounting point S of the rear subframe 136 due to input force from the lower arm 137 becomes larger than input force Fz, which is imparted downward in a vertical direction with respect to the mounting point S of the rear subframe 136 due to input force from the lower arm 137. Therefore, in the rear underbody structure according to the present embodiment, since the length Lz between the line M which connects the respective axial centers P of the pair of rear floor side members 112 and the mounting point S of the rear subframe 136 is set shorter than the length Ly between a vertical line H drawn from the respective axial centers P of the pair of rear floor side members 112 and the mounting point S of the rear subframe 136 (Lz<Ly), moment about the axial center P of the rear floor side members 112 after offsetting approaches zero and road noise also can be reduced even more.

Further, since the present embodiment provides the reinforcing plate 126, input force from the rear subframe 136 can be reliably transmitted to the rear floor side member 112. Further, since the spacer 134 is provided to make the length of the mounting bolt 138 longer, the rigidity of a region in the vicinity of the mounting point S of the rear subframe 136 is improved.

Figure 7:
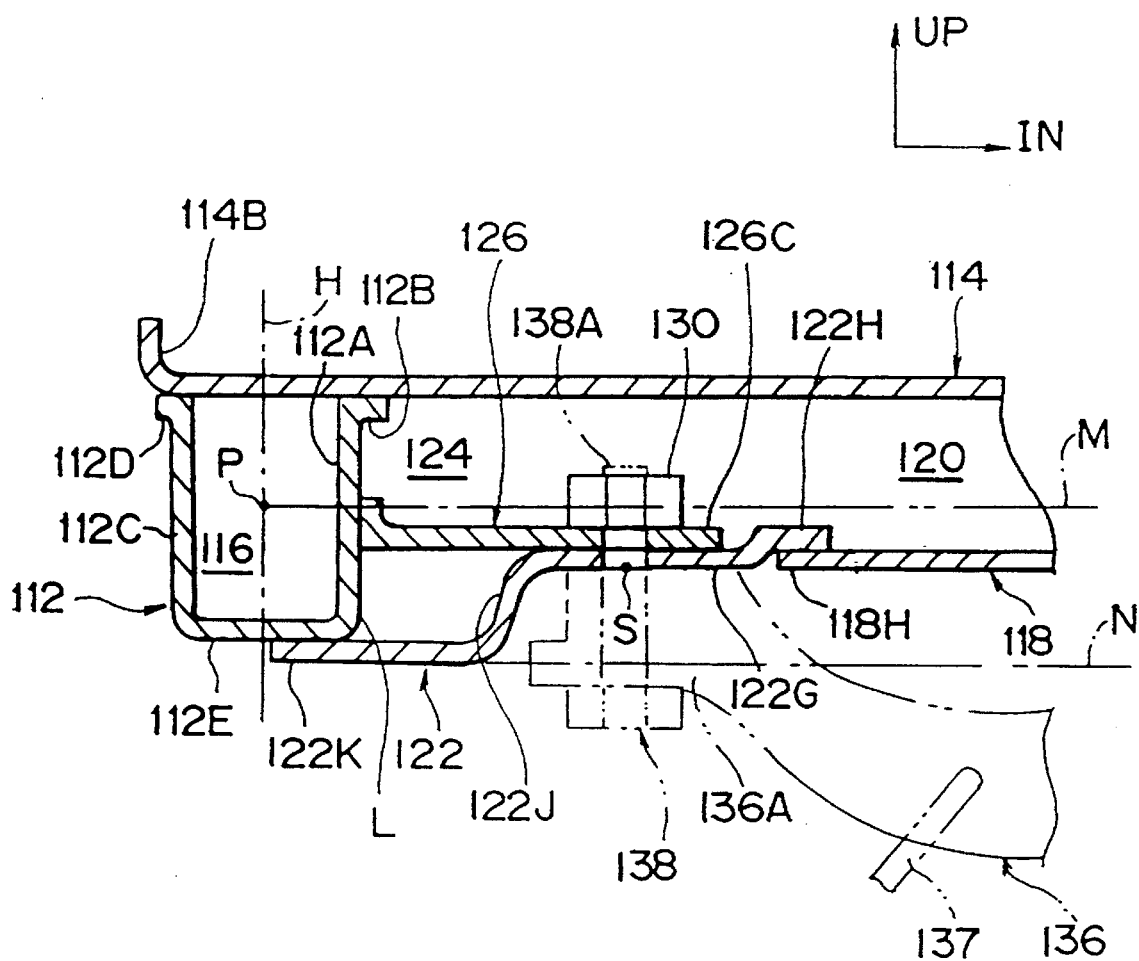
FIG. 7 is a cross-sectional view, when seen from the front of the vehicle body, illustrating a modified embodiment of the rear underbody structure according to the second embodiment.

As illustrated in FIG. 7, the spacer 134 may be removed and the mounting position of the reinforcing plate 126 may be lowered so that the base portion 122G of the bracket 122 and the base portion 126C of the reinforcing plate 126 may be directly welded to each other.

Next, a third embodiment of the rear underbody structure according to the present invention will be described with reference to FIGS. 8A and 8B. Note that the same reference numbers are hereinafter given for components identical to those described in the second embodiment; therefore, descriptions related thereto will be omitted.

Figure 8A:
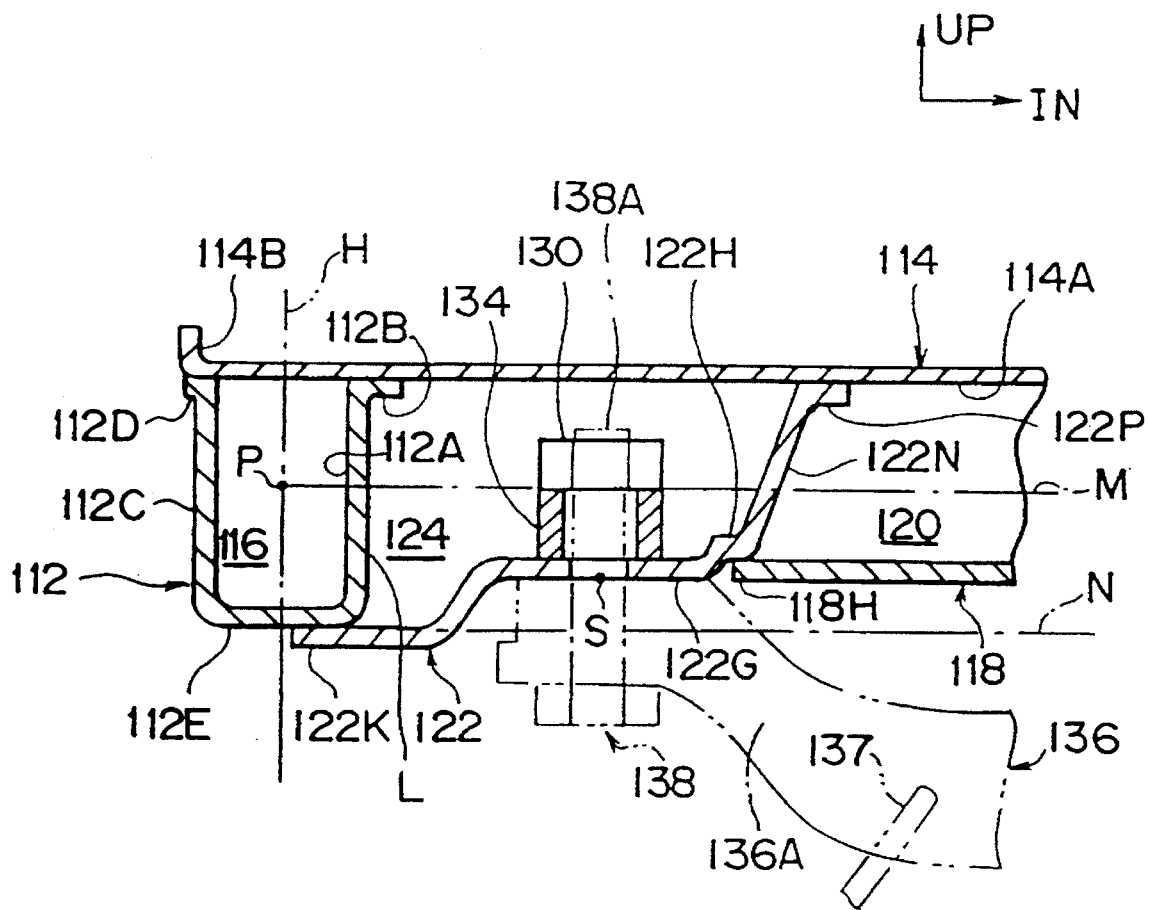
FIG. 8A is a cross-sectional view, when seen from the front of the vehicle body, illustrating a rear underbody structure according to a third embodiment of the present invention.
Figure 8B:
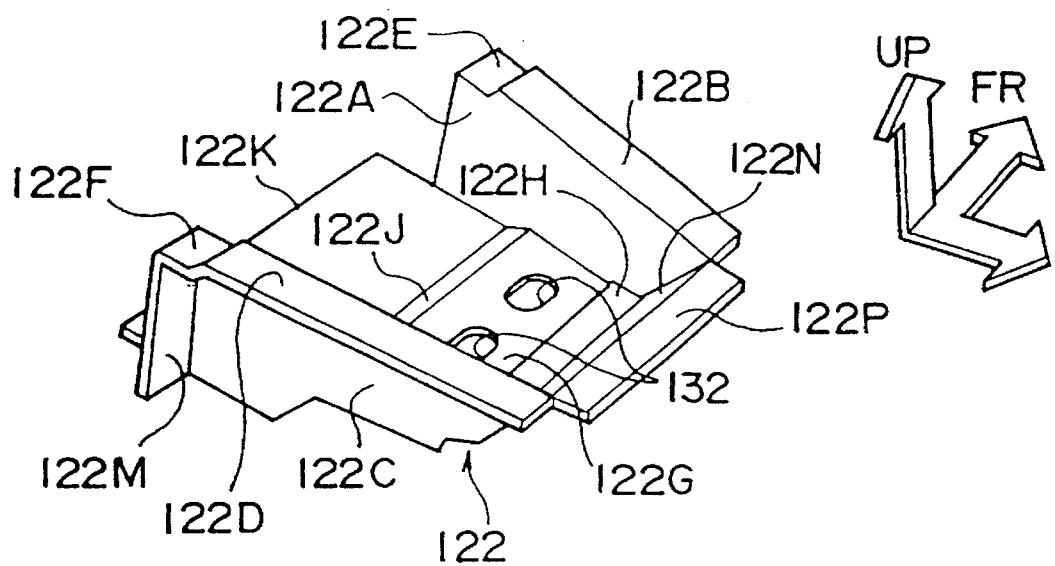
FIG.8B is a perspective view, when seen diagonally from the front of an inner vehicle body, illustrating a bracket of the rear underbody structure according to the third embodiment of the present invention.

FIGS. 8A and 8B illustrate a bracket 122 according to the present embodiment. In the bracket 122, a side wall portion 122N is formed from an inner end edge portion, in the transverse direction of the vehicle body, of a step portion 122H to an upward and diagonally inward direction of the vehicle body. The end portions in the longitudinal direction of the vehicle body of the side wall portions 122N are respectively welded to the front-side wall portion 122A in the longitudinal direction of the vehicle body and the rear-side wall portion 122C in the longitudinal direction of the vehicle body. Further, an upper end portion of the side wall portion 122N is formed into a flange 122P which is oriented inward in the transverse direction of the vehicle body. The flange 122P is welded to a lower surface 114A of the rear floor pan 114.

Accordingly, as illustrated in FIG. 8A, an enclosed cross-sectional configuration 124 formed by the bracket 122, the rear floor side members 112, and the rear floor pan 114 is an enclosed cross-sectional configuration when seen from the longitudinal direction of the vehicle body as well. As a result, even though the reinforcing plate 126 described in the second embodiment is not provided, the connecting rigidity of these components can be improved. Thus, benefits which are similar to those of the second embodiment are obtained from the present embodiment. Incidentally, the nut 130 is directly welded to the spacer 134.

Figure 9:
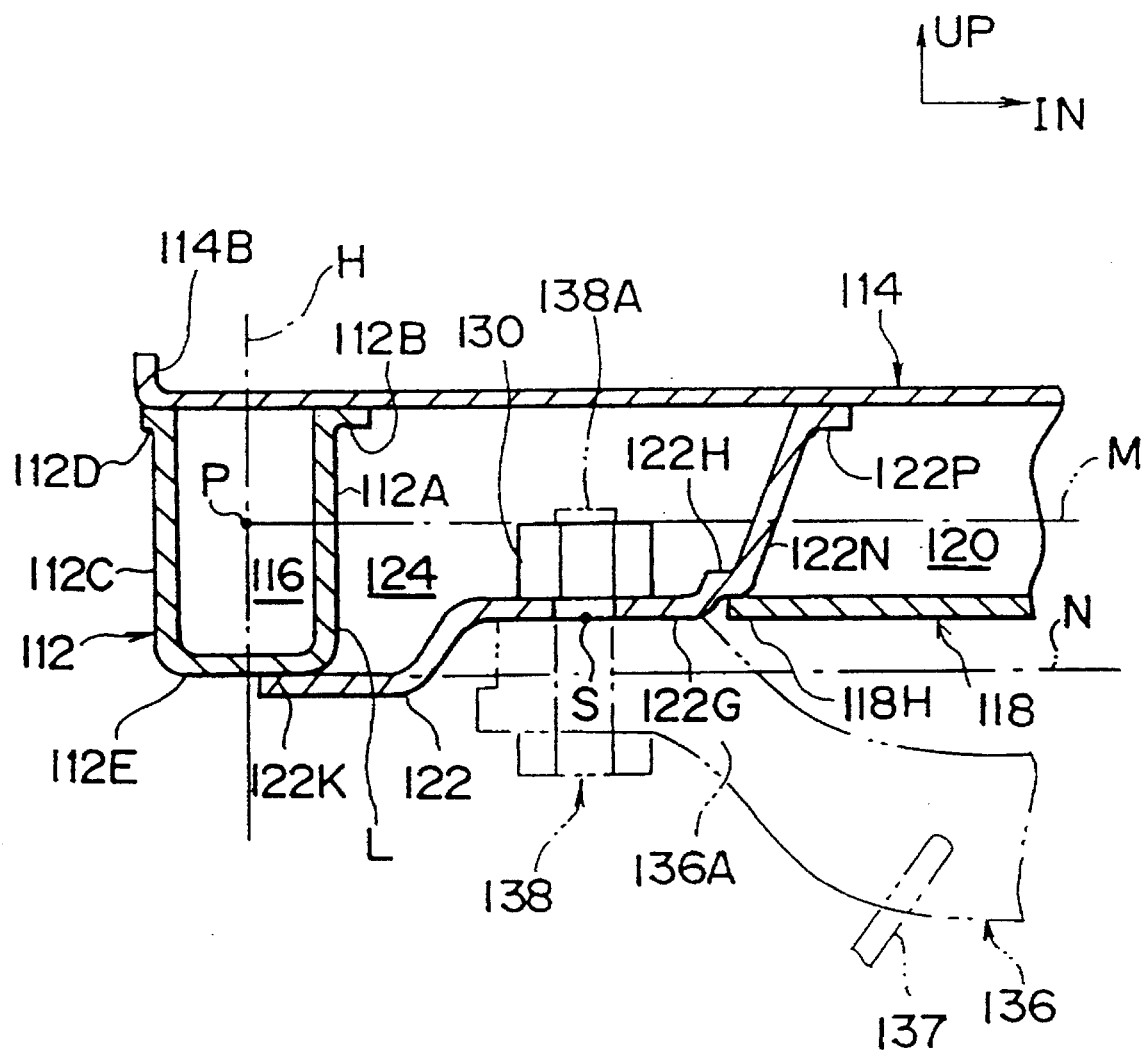
FIG. 9 is a cross-sectional view, when seen from the front of the vehicle body, illustrating a modified embodiment of the rear underbody structure according to the third embodiment.

Further, as illustrated in FIG. 9, the spacer 134 may be removed so that the nut 130 can be directly welded to the base portion 122G of the bracket 122.

Next, a fourth embodiment of the rear underbody structure according to the present invention will be described with reference to FIG. 10. Note that the same reference numbers are hereinafter given for components identical to those described in the second embodiment; therefore, descriptions related thereto will be omitted.

Figure 10:
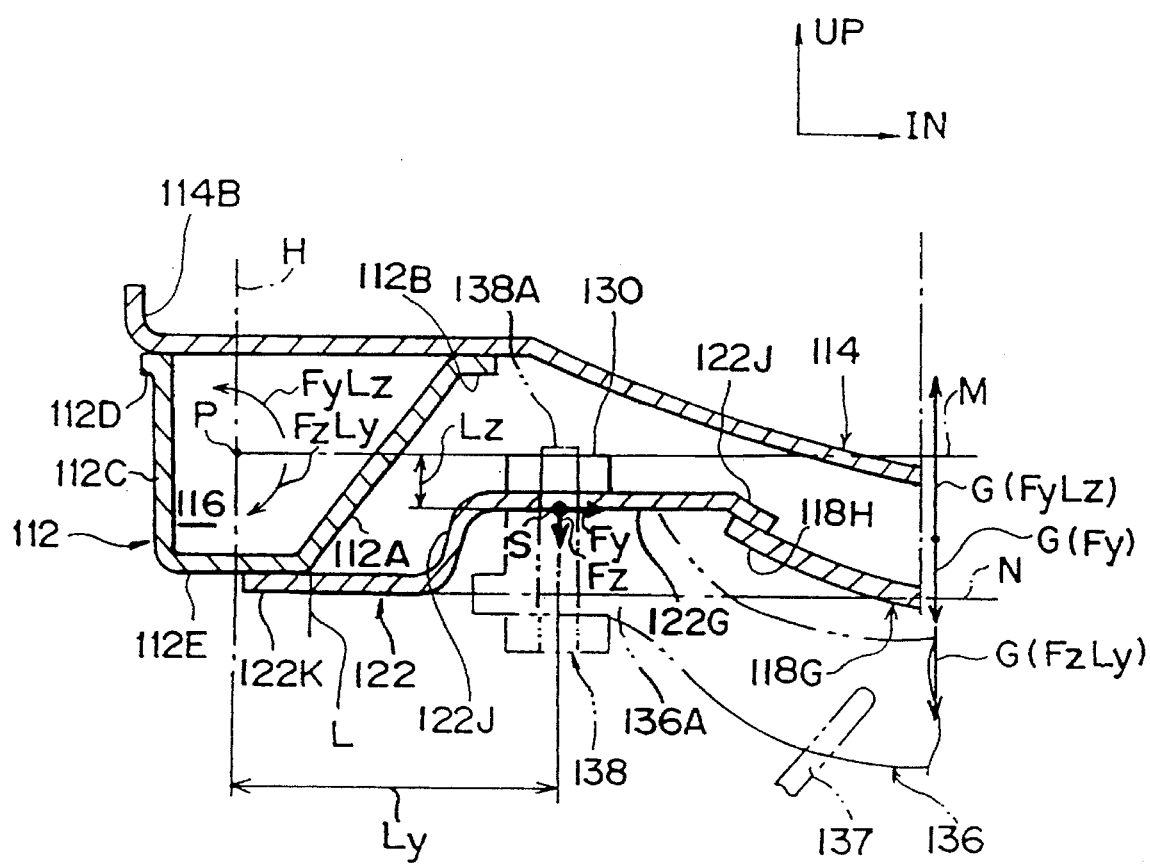
FIG. 10 is a cross-sectional view, when seen from the front of the vehicle body, illustrating a rear underbody structure according to a fourth embodiment of the present invention.

As illustrated in FIG. 10, in the present embodiment, a region of a rear floor pan 114 between a pair of rear floor side members 112 is bent downward in the form of a circular arc. A flange 122J oriented downward and inward in the transverse direction of the vehicle body is formed at an inner end portion, in the transverse direction of the vehicle body, of the base portion 122G of the bracket 122. The flange 122J is welded to an outer end portion 118H, in the transverse direction of the vehicle body, of the base portion 118G of a rear floor cross member 118 which is bent downward along the rear floor pan 114 so as to be formed in a circular arc.

Accordingly, as illustrated in FIG. 10, when input force Fy imparted inward in a horizontal direction and input force Fz imparted downward in a vertical direction are applied to the mounting point S of the rear subframe 136, moment FyLz and moment FzLy operate on the axial center P of the rear floor side members 112. In this case, if the rear floor cross member 118 extends straight, input force Fy (which serves as a compressive force with respect to the rear floor cross member 118) does not easily deform the rear floor cross member 118. In the present embodiment, since the rear floor cross member 118 is bent downward in the form of a circular arc, the rear floor cross member 18 is bent downward by the compressive force Fy.

At this time, the displacement of the rear floor cross member 118 (as shown by arrow G (Fy) in FIG. 10) is in the direction opposite to the displacement of the rear floor cross member 118 (as shown by arrow G (FyLz) in FIG. 10) generated by moment FyLz about the axial center P of the rear floor side member 112 due to input force Fy. Accordingly, the displacement G (FyLz) of the rear floor cross member 118 which is caused by moment FyLz can be offset by the displacement G (FzLy) of the rear floor cross member 118 caused by moment FzLy and the displacement of the rear floor cross member 118 (as shown by arrow G (Fy)) caused by the compressive force Fy. As a result, deformation of the rear floor cross member 118 can be controlled without substantially shifting the mounting point S inward in the transverse direction of the vehicle body.

Figure 11:
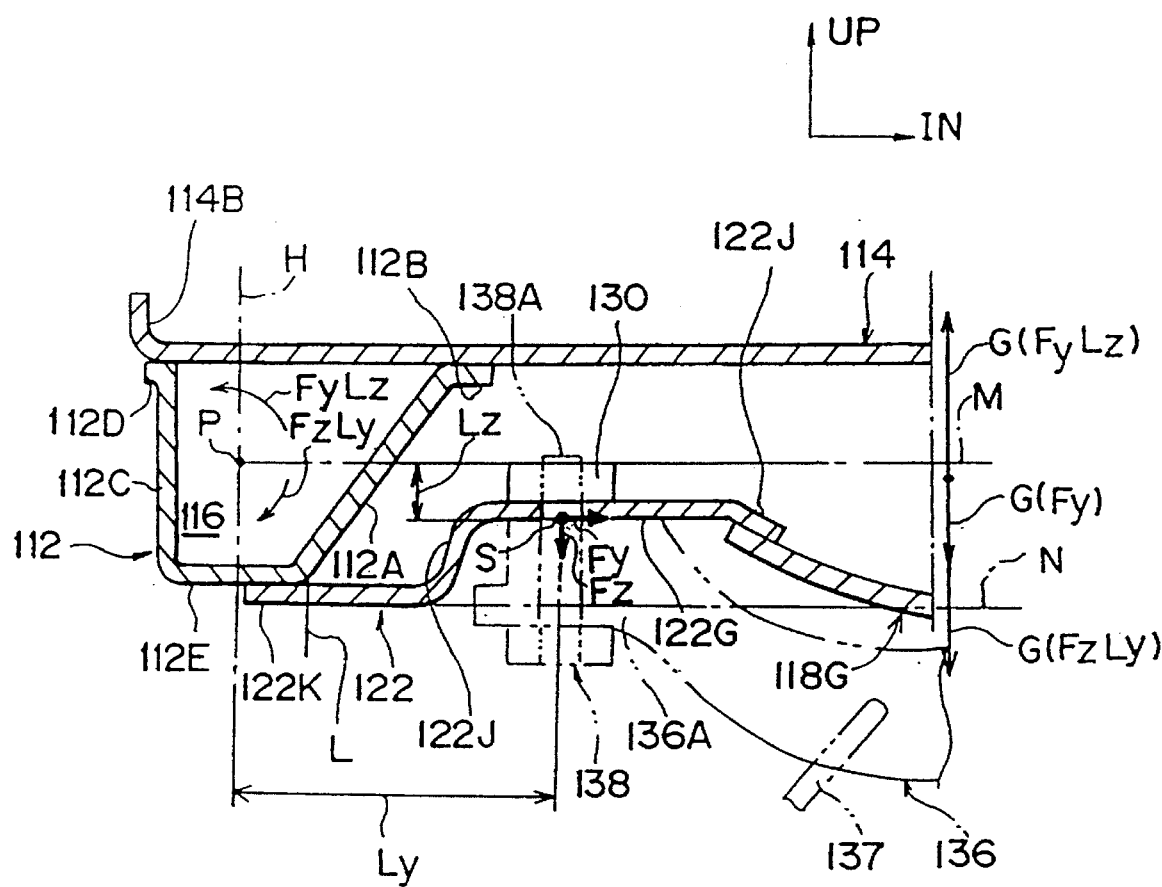
FIG. 11 is a cross-sectional view, when seen from the front of the vehicle body, illustrating a modified embodiment of the rear underbody structure according to the fourth embodiment.

In the present embodiment, a region of the rear floor pan 114 between the pair of rear floor side members 112 is bent downward in the form of a circular arc, and the base portion 118G of the rear floor cross member 118 is also bent downward along the rear floor pan 114 so as to be formed in a circular arc. However, instead of this configuration, in order to ensure the rigidity of the rear floor, it suffices that the rear floor pan 114 is disposed horizontally and only the base portion 118G of the rear floor cross member 188 is bent downward in the form of a circular arc, as shown in FIG. 11.

Next, a fifth embodiment of the rear underbody structure according to the present invention will be described with reference to FIG. 12. Note that the same reference numbers are hereinafter given for components identical to those described in the second embodiment; therefore, descriptions related thereto will be omitted.

Figure 12:
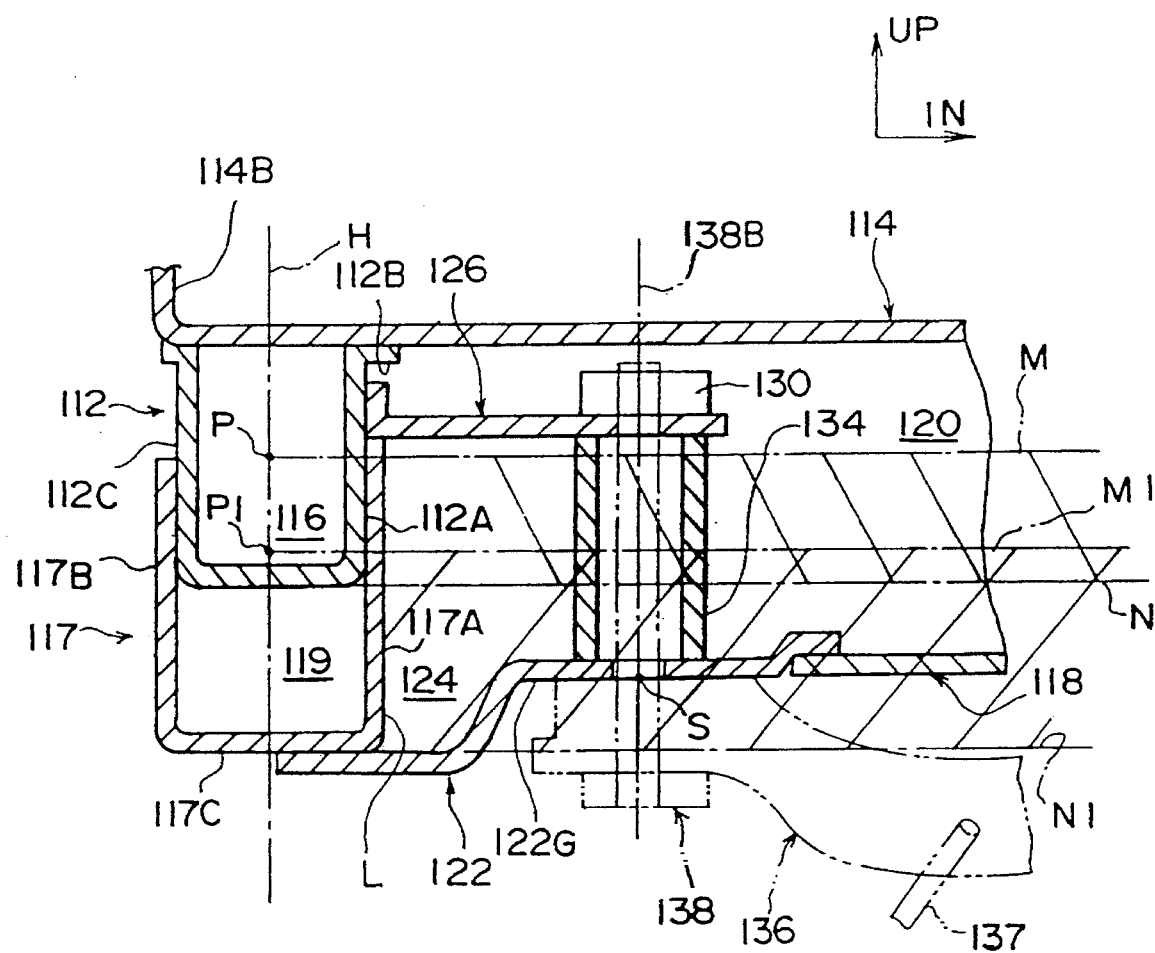
FIG. 12 is a cross-sectional view, when seen from the front of the vehicle body, illustrating a rear underbody structure according to a fifth embodiment of the present invention.
Figure 13:
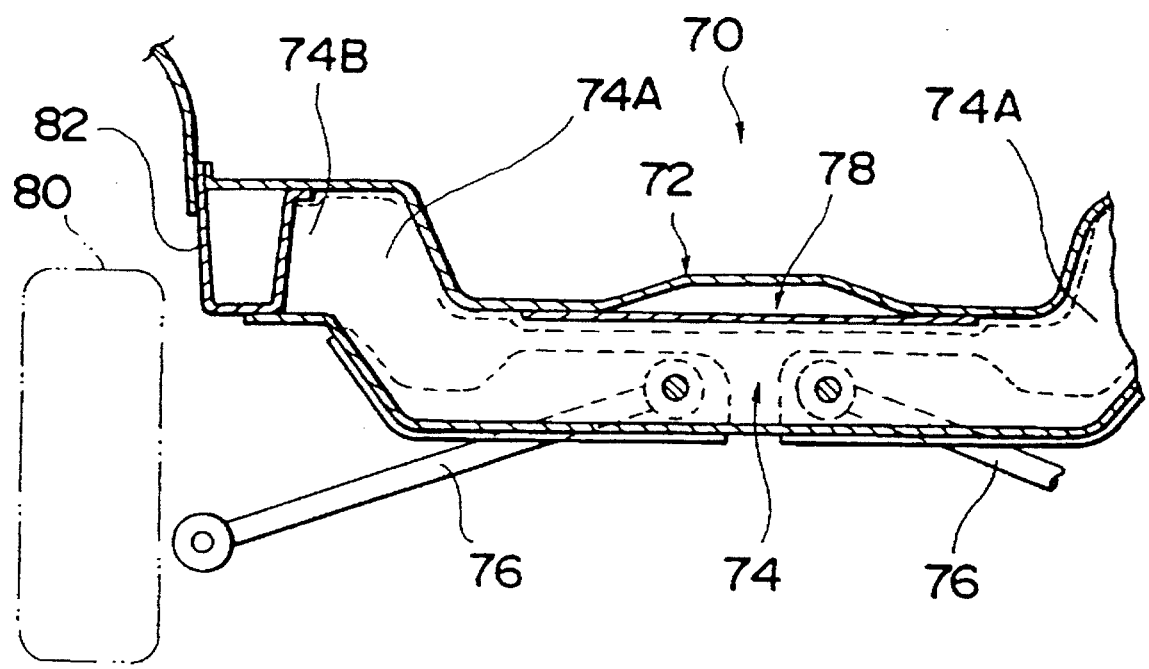
FIG. 13 is a cross-sectional view, when seen from the front of the vehicle body, illustrating a conventional rear underbody structure.
Figure 14:
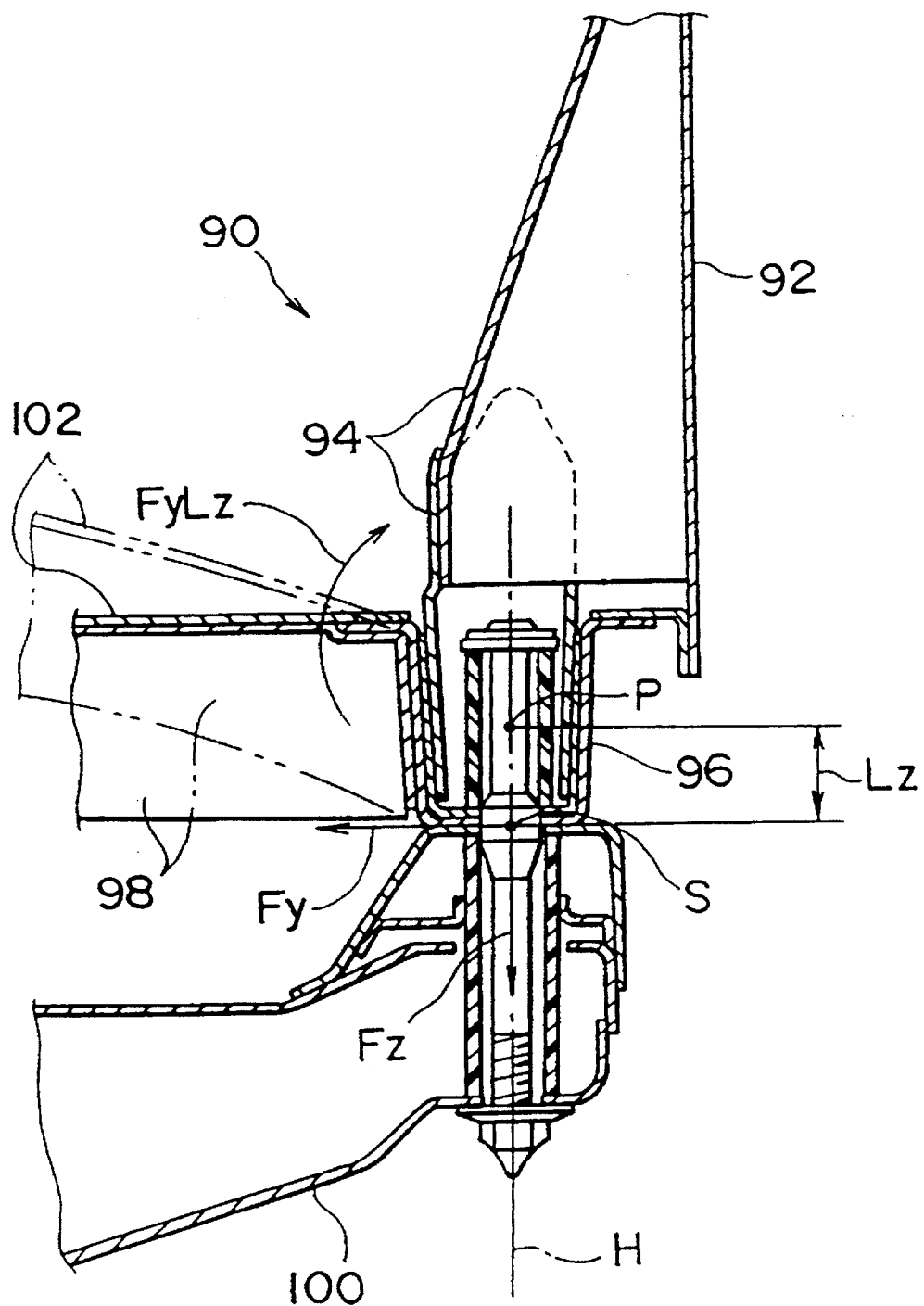
FIG. 14 is a cross-sectional view, when seen from the front of the vehicle body, illustrating another conventional rear underbody structure.

FIG. 12 illustrates a rear floor side member bracket 117 according to the present embodiment, which is interposed between the rear floor side member 112 and the bracket 122. The rear floor side member bracket 117 has a substantially U-shaped cross-sectional configuration when seen from the longitudinal direction of the vehicle body, with an opening thereof being oriented upward. An upper end portion of an inner wall portion 117A, in the transverse direction of the vehicle body, of the bracket 117 is welded to a lower portion of an inner wall portion 112A, in the transverse direction of the vehicle body, of the rear floor side member 112. Further, an upper end portion of an outside wall portion 117B, in the transverse direction of the vehicle body, of the bracket 117 is welded to a lower portion of an outside wall portion 112C, in the transverse direction of the vehicle body, of the rear floor side member 112. As a result, the rear floor side member bracket 117, together with the rear floor side member 112, forms an enclosed cross-sectional configuration 119 under and along the enclosed cross-sectional configuration 116.

Accordingly, an axial center P1 of a region in which the bracket 117 of the rear floor side member 112 is mounted is positioned under an axial center P of the rear floor side member 112. As a result, a region (as shown by the lines slanted upwardly to the right in FIG. 12) which is located inwardly of the respective inner surface positions L of the pair of rear floor side members 112 in the transverse direction of the vehicle body, between the line M, which connects the respective axial centers P of the pair of rear floor side member brackets 117, and the line N, which connects lower end surfaces of the base portions 117C of the pair of rear floor side member brackets 117, i.e., an offset region, is made larger than an offset region when no rear floor side member bracket 117 is provided (as shown by the lines slanted downwardly to the right in FIG. 12). The degrees of freedom for the mounting point S are thereby greatly increased.

What is claimed is:

1. A rear underbody structure comprising:

a pair of rear floor side members disposed along a longitudinal direction of a vehicle body in respective vicinities of both end portions, in a transverse direction of the vehicle body, of a rear-under section of the vehicle body;

a cross member being respectively connected to opposing side surfaces of said pair of rear floor side members at respective end portions of said cross member in the transverse direction of the vehicle body, said cross member extending straight in the transverse direction of the vehicle body and spaced apart from a rear floor pan connected to an upper end of said rear floor side member, and said cross member having an enclosed rectangular cross-sectional configuration when seen from the transverse direction of the vehicle body, and being rectangularly formed with an aspect ratio such that a dimension of said cross member in a longitudinal direction of the vehicle body is greater than a dimension of said cross member in a vertical direction of the vehicle body; and a lower-arm bracket which is connected to a lower portion of said cross member and supports a rear lower arm.

2. A rear underbody structure according to claim 1, wherein said pair of rear floor side members each has a channel-shaped cross-sectional configuration when seen from the longitudinal direction of the vehicle body, with an opening of the channel-shaped cross-sectional configuration being oriented upward, and the opening is closed by said rear floor pan so as to form an enclosed cross-sectional portion which extends in the longitudinal direction of the vehicle body.

* * * * *